United States Patent

Hill et al.

(10) Patent No.: US 9,032,387 B1
(45) Date of Patent: May 12, 2015

(54) SOFTWARE DISTRIBUTION FRAMEWORK

(75) Inventors: Peter F. Hill, Seattle, WA (US); Donald Ryan Willhoit, Southgate, KY (US)

(73) Assignee: Amazon Technologies, Inc., Seattle, WA (US)

(*) Notice: Subject to any disclaimer, the term of this patent is extended or adjusted under 35 U.S.C. 154(b) by 218 days.

(21) Appl. No.: 13/252,834

(22) Filed: Oct. 4, 2011

(51) Int. Cl.
*G06F 9/445* (2006.01)
(52) U.S. Cl.
CPC ........................................ *G06F 8/61* (2013.01)
(58) Field of Classification Search
CPC ........ G06F 8/65; G06F 8/61; H04L 29/08981
USPC .......................................... 717/173, 717, 178
See application file for complete search history.

(56) References Cited

U.S. PATENT DOCUMENTS

| 2004/0015961 | A1* | 1/2004 | Chefalas et al. | 717/178 |
| 2004/0054764 | A1* | 3/2004 | Aderton et al. | 709/223 |
| 2005/0132354 | A1* | 6/2005 | Edwards et al. | 717/174 |
| 2005/0223101 | A1* | 10/2005 | Hayes, Jr. | 709/228 |
| 2009/0199013 | A1* | 8/2009 | Raciborski | 713/176 |

OTHER PUBLICATIONS

"Software Distribution with OSGi Bundles"; IBM.com infocenter webpage; Apr. 12, 2005.*
"Prerequisites"; Advanced Installer User Guide; advancedinstaller.com website as captured by the Wayback Machine Internet archive (archive.org) May 5, 2010.*
"Prowl Push Notifications"; drupal.org website; Jul. 12, 2009.*
"How Does One Install a Program File on 'D' Drive With Windows 7 64-bit?"; Tom's Hardware tech forum webpage (tomshardware.com); May 20, 2010.*
"Installing 3rd party programs in a non-system partition"; majorgeeks.com website; Jul. 25, 2008.*
Rich Robinson; "Block Drives, Folders, and Files from Other 7/Vista User Accounts [How to]"; mintywhite.com website; Jan. 18, 2009.*

* cited by examiner

*Primary Examiner* — Anna Deng
(74) *Attorney, Agent, or Firm* — Lee & Hayes, PLLC

(57) ABSTRACT

A computing device receives a notification from a server that a bundle is available for download. The bundle includes software written in a scripting language. The computing device downloads the bundle from the server and authenticates a digital signature of the bundle. The computing device installs the bundle in a user partition of the memory and modifies a path variable in an operating system of the computing device. The path variable is modified to include a location of the installed bundle.

25 Claims, 7 Drawing Sheets

| Application or Software Update 402 | Prerequisite Applications 122 | Prerequisite Features 124 | Prerequisite System Software 404 | Prerequisite Hardware 406 |
|---|---|---|---|---|
| 1st Application | None | None | 1st System Software | 1st Generation Monochrome Display |
| 2nd Application | 1st Application | None | 1st System Software | 2nd Generation Color Display |
| 3rd Application | None | 1st Feature | 1st System Software | 1st Generation All Versions |
| 4th Application | 2nd Application | 1st Feature and 2nd Feature | 2nd System Software | 2nd Generation 32GB Version |
| 5th Application | 1st Application and 3rd Application | None | 3rd System Software | All Generations All Versions |
| 6th Application | None | None | 1st System Software | All Generations GPS Capable |
| 1st Software Update | None | 3rd Feature | 1st System Software | All Generations All Versions |
| 2nd Software Update | None | 1st Software Update | 1st System Software | All Generations Color Display |

Dependencies 114

FIG. 4

SOFTWARE DISTRIBUTION FRAMEWORK

BACKGROUND

Computing devices, such as tablet computing devices, wireless phones, or electronic book ("eBook") reader devices, may include system software (e.g., an operating system, device drivers, and the like). System software updates may be provided to add additional features, fix bugs, or both. To verify backward compatibility, the system software updates may be tested extensively with available applications and with different hardware versions of a particular computing device. For this reason, system software updates may be released infrequently. In addition, features that benefit a particular hardware version of a computing device may be excluded from a system software update if the features are incompatible with other hardware versions of the computing device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates an example of dependencies.

DETAILED DESCRIPTION

Figure 1:
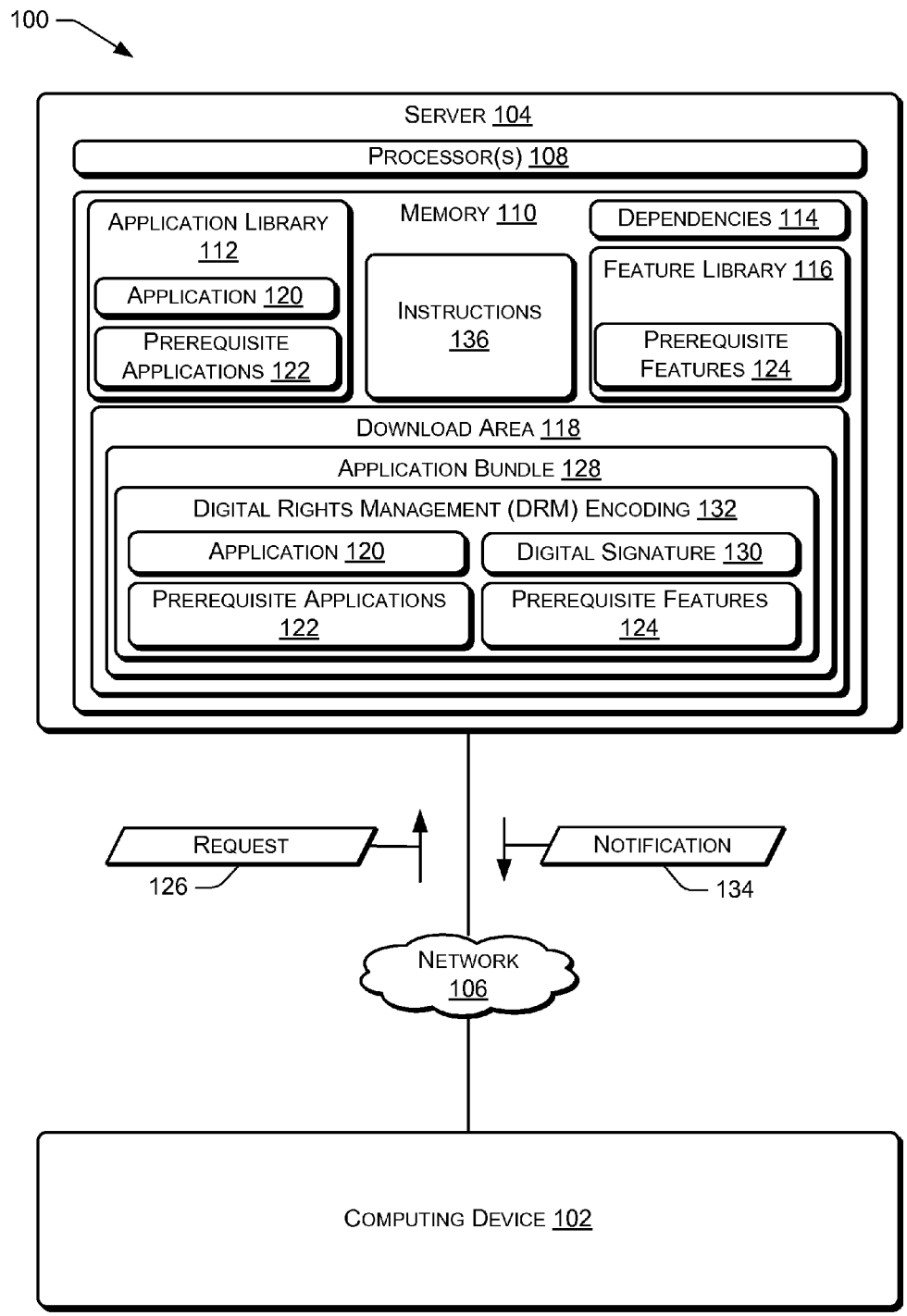
FIG. 1 illustrates an example framework to distribute software.

This disclosure describes architectures and techniques to provide a framework for distributing software to computing devices. For example, a computing device, such as a tablet computing device or an eBook reader device, may include system software (e.g., an operating system, device drivers, and the like). The system software may be stored in a system partition in the memory of the computing device while everything else, such as applications, features, and content (e.g., audio files, videos files, and the like) may be stored in a user partition. An application may include computer software that a user may interact with to perform one or more specific functions. A feature may include computer software that adds or modifies the functionality of an application. A user may interact with an application while the application may interact with one or more features. For example, an application may enable a user to read an electronic book ("eBook") while a feature associated with the application may enable the user to enter and store annotations for the eBook.

The system partition may be protected to prevent the system software from being modified by the applications, features, a user of the computing device, or any combination thereof. The system partition may be modifiable under specific circumstances, such as when the system software is being updated. Applications, features, the user, or any combination thereof may be capable of modifying at least portions of the user partition. For example, the system software may provide a particular application with a portion of the user partition. The particular application may write to the portion of the user partition but not to other portions of the user partition that are used by other applications.

The system software may include a path variable that identifies locations (e.g., directories) of executable applications and features in the memory of the computing device. When a new application or a new feature is installed in a particular location of the user partition, the path variable may be updated to include the particular location of the user partition.

The computing device may be available in different versions and in different generations. For example, different versions of the computing device may have different attributes, such as a type of display (e.g., color or monochrome), an amount of installed memory (e.g., 16 G, 32 GB, 64 GB, and the like), a type of wireless interface (e.g., WiFi, code division multiple access (CDMA), global system for mobile (GSM), and the like), other attributes, or any combination thereof. Each generation of the computing device may reflect hardware components available when a particular generation of the computing device was manufactured. For example, a newer generation computing device may have a different version of a processor compared to an older generation computing device. The newer version of the processor may have a larger cache, a faster clock speed, additional core(s), other features, or any combination thereof.

When a feature is developed for inclusion in a system software update, the feature may be tested for compatibility with one or more generations of the computing device and with one or more versions of the computing device. For example, the manufacturer may support the current and previous generation of the computing device but may not support other (e.g., older) generations of the computing device. If the feature is determined to be compatible with at least some of the versions of the supported generations of the computing device, then the feature may be included in a next system software update. If the feature is incompatible with at least one supported generation and/or version of the computing device, then the feature may be not be included in the next system software update. The time required to test for compatibility may result in system software updates being released infrequently, such as once or twice a year. This may cause users to wait for bug fixes or new features or may cause delays in third party developers developing applications that utilize the new features. In addition, a feature that is capable of being executed on a newer generation computing device may be excluded from the system software update because it is incompatible with older generation computing devices.

Software updates, bug fixes, applications, features, or any combination thereof may be provided to users by installing them in the user partition. One or more of the software updates, the bug fixes, the applications, or the features may be written using a scripting language, such as Java®. The path variable in the system software may be updated to include the installation location(s) in the user partition. For example, a user may instruct a server to initiate acquiring an application. The server may determine that the user has a second generation computing device and create an application bundle for use with the second generation computing device. The application bundle includes the application along with any (e.g., zero or more) prerequisite applications and any (e.g., zero or more) prerequisite features associated with the application. For example, if the application has no associated prerequisite applications and no associated prerequisite features, then the application bundle may include just the application. The server may include in the application bundle any prerequisite applications associated with the application and any prerequisite features associated with the application. For example, the user may purchase an update (e.g., version two) of a particular application that has version one of the particular application as an associated prerequisite application. To illustrate, an installer may install version two of the particular application after determining that version one of the particular application is currently installed. The prerequisite applications and prerequisite features included in the application bundle may be determined based at least partially on the generation of the computing device and the version of the computing device. Thus, prerequisite applications and prerequisite features that are compatible with the user's computing device may be included in the application bundle. To illustrate, a second generation computing device may include capabilities (e.g., hardware and/or software) to determine a location of the computing device using a technology such as global positioning satellites (GPS), while a first generation computing device may not include these capabilities. Applications and features included in an application bundle for the second generation computing device may include particular applications and particular features that provide additional services based on location information while applications and features included in an application bundle for the first generation computing device may exclude the particular applications and particular features.

In addition, software update bundles may be provided based on a configuration of the hardware and software of a computing device. A server that provides the software update bundles may determine the configuration of the hardware and the software (e.g., a system software version, a version number of each installed application, and a version number of each installed feature) of the computing device. In some instances, the server may maintain a catalog of the configuration of the computing device and update the configuration when the applications, features, system software, or combinations thereof are downloaded. In some instances, the server may determine the configuration of the computing device whenever a download is initiated by the computing device. Thus, a software update bundle may be created based on the configuration of each computing device, such that a first software update bundle for a first device may be different from a second software update bundle for a second computing device. For example, a particular application may use a portion of the system software that includes a bug. Other applications may not use that portion of the system software. Thus, a first software update bundle for users who have acquired the particular application may include a feature that addresses the bug. Other users may be provided with a second software update bundle that does not include the feature that addresses the bug.

When a new system software update is provided, the new system software update may include new features and/or bug fixes that address bugs in the system software. When the new system software update is installed, the installation process may include removing features from the user partition that are included in the new system software. For example, a feature may initially be provided in a software update bundle and installed in the user partition. The feature may add new functionality to the system software, address a bug in the system software, or both. Later, when a system software update that includes the feature is installed, the feature may be removed from the user partition.

The application bundles and software update bundles may use a digital rights management (DRM) encoding mechanism to prevent unauthorized usage or distribution of the bundles. For example, a user may acquire an application and download a corresponding application bundle. The application bundle may be encoded using DRM. The DRM encoding may enable the application bundle to be installed on a computing device that is associated with the user and prevent the installation of the application bundle on other computing devices. For example, the DRM encoding mechanism may include tamper-proof metadata identifying a particular user or user-device(s) associated with the particular user on which the application bundle or software bundle may be installed.

A digital signature may be included in each application bundle or software update bundle to identify a creator or author of each bundle. The computing device may authenticate the digital signature prior to installation of each application bundle or software update bundle. The application bundle or software update bundle may not be installed if the digital signature cannot be authenticated.

Accordingly, the architectures and techniques described herein provide a flexible and automated system to enable providing application bundles and software update bundles that may be tailored to the specific hardware and software configuration of each computing device. The application bundles and software update bundles may be installed in the user partition. A path variable in the system software may be updated to include locations where contents (e.g., applications and/or features) of the application bundles or the software bundles were installed in the user partition. Updating the path variable may enable the system software to locate and execute the installed applications and/or features. The application bundles and software updates may be provided more frequently compared to the frequency with which system software updates are provided. At least one of the features and/or applications included in an application bundle or software update bundle may be included in a new system software update. During installation of the new system software update, previously installed features and/or applications that are included in the new system software update may be removed from the user partition of the memory of the computing device.

Example Frameworks

FIG. 1 illustrates an example framework 100 to distribute software. The framework 100 includes a computing device 102 coupled to a server 104 via a network 106. The network 106 may include multiple networks using a variety of technologies, such as wireless technologies (e.g., global system for mobile (GSM), code division multiple access (CDMA), universal mobile telephone service (UMTS), WiFi, WiMax®, and the like), wireline technologies (e.g., public switched telephone network (PSTN), digital subscriber line (DSL), synchronous optical network (SONET), and the like), other types of communications technologies, or any combination thereof.

The computing device 102 may include one or more processors and a memory to store instructions that are executable by the one or more processors. For example, one or more applications from the applications library 116, one or more features from the feature library 118, or any combination thereof may be installed in the computing device 102. The computing device 102 may include an application to view and interact with an electronic book ("eBook").

The server 104 may include one or more processors 108 and a memory 110. The server 104 may host a site that provides items (e.g., tangible items, downloadable items, subscription-based items, service-based items, and the like) for acquisition. The memory 110 may include an applications library 112, dependencies 114, feature library 116, and a download area 118. In some implementations, the server 104 may include multiple servers and the contents of the memory 110 may distributed across the multiple servers. For example, a first server of the multiple servers may host the applications library 112, a second server of the multiple servers may host the feature library 116, and a third server of the multiple servers may host the download area 118. The applications library 112 may include applications, such as the application 120, that may be downloaded to and executed in a computing device, such as the computing device 102. Based on how the application 120 is implemented, the application 120 may be a standalone application or the application 120 may have one or more prerequisite applications 122. For example, the application 120 may use at least a portion of the functionality provided by the one or more prerequisite applications 122 and therefore have a dependency to the prerequisite applications 122. The dependencies 114 may include dependencies between a particular application and other applications in the applications library 112, such as the dependency between the application 120 and the prerequisite applications 122.

The feature library 116 may include one or more features that may be downloaded to and executed in a computing device, such as the computing device 102. The features in the feature library 116 may provide additional functionality to one or more applications that have been installed on the computing device 102. For example, the feature library 116 may include a device capabilities application programming interface (API), concurrency APIs, extended markup language (XML) parsers, java script object notation (JSON) parsers, rich text layout components, wireless connection type identifier (e.g., identify whether a wireless connection is WiFi, WiMax®, CDMA, or GSM), remote (e.g., cloud) computing services, device type identifier, in-application purchase, other features, or any combination thereof.

Based on how the application 120 is implemented, the application 120 may be a standalone application or the application 120 may have one or more prerequisite features 124. For example, the application 120 may use at least a portion of the functionality provided by the one or more prerequisite features 124 and therefore have a dependency to the prerequisite features 124. The dependencies 114 may include dependencies between a particular application and features in the feature library 116, such as the dependency between the application 120 and the prerequisite features 124. Thus, the application 120 may be a standalone application, the application 120 may have a dependency on the prerequisite applications 122, the application 120 may have a dependency on the prerequisite features 124, or the application 120 may have a dependency on the both the prerequisite applications 122 and the prerequisite features 124.

The dependencies 114 may include information identifying the applications in the application library 112 that are compatible with a particular generation of the computing device 102, a particular version of the computing device 102, a current system software of the computing device 102, a current set of applications that are installed in the computing device 102, a current set of features that are installed in the computing device 102, other hardware or software characteristics of the computing device 102, or any combination thereof.

One or more of the applications in the applications library 112 or one or more of the features in the feature library 116 may be written using a scripting language, such as Java®. For example, a development kit may be provided to enable developers to create applications or features using the scripting language. In some instances, software developers may create features and make the features available for acquisition by other developers. For example, a first software developer may create a feature that provides a game engine. A second software developer may acquire (e.g., purchase or lease) the game engine from the first software developer and develop a game that uses the game engine.

In operation, a user may send a request 126 to acquire the application 120. The request 126 may be sent from the computing device 102, from another computing device associated with the user, or from a second server. For example, the server 104 may include multiple servers (e.g., physical servers, virtual servers, or both), in which a first server processes an order from a user to acquire the application 120 via a merchant site. The first server may send the request 126 to a second server (e.g., the server 104) to instruct the second server to prepare the application bundle 128. Thus, the request 126 may be associated with the user, but may be received from the computing device 102, from another computing device associated with the user, or another server. In response, the server 104 may create an application bundle 128. The application bundle 128 may include the application 112. Based on the dependencies 114 that are associated with the application 120, the application bundle 128 may include the prerequisite applications 122, the prerequisite features 124, or both. In some implementations, the application bundle 128 may include multiple bundles. For example, the application bundle 128 may include a first bundle that includes the application 120, a second bundle that includes any prerequisite applications 122, or a third bundle that includes any of the prerequisite features 124.

In some implementations, the application bundle 128 may include a digital signature 130. In some implementations, the digital signature 130 may include multiple digital signatures, such as a digital signature for each application or feature in the application bundle 128. For example, the digital signature 130 may include a digital signature for the application 112, a digital signature for each of the prerequisite applications 122, a digital signature for each of the prerequisite features 124, or any combination thereof. The digital signature may identify an author, a provider, a manufacturer, or other characteristic of a feature or an application. For example, a digital signature associated with each application or feature in the application bundle 128 may identify their respective authors while the digital signature 130 may identify a provider (e.g., a merchant) of the application bundle 128.

In some implementations, the contents of the application bundle 128 may be encoded using a DRM encoding 132 to prevent unauthorized usage. For example, the DRM encoding 132 may enable a user who acquires the application 120 to install the application bundle 128 in the computing device 102 and prevent the application bundle 128 from being installed in other computing devices.

After creating the application bundle 128, the server 104 may place the application bundle 128 in the download area 118. In FIG. 1, the download area 118 is depicted as part of the memory 110 of the server 104. However, in some implementations, the download area 118 may be in a memory of another server, such as a download server. The server 104 may send a notification 134 to the computing device 102 via the network 106 to notify the computing device 102 that the application bundle 128 is available.

In some implementations, in response to receiving the notification 134, the computing device 102 may automatically (e.g., without human interaction) initiate download of the application bundle 128 from the download area 118. In other implementations, in response to receiving the notification 134, the computing device 102 may notify a user that the application bundle 128 is available for download, and initiate download of the application bundle 128 in response to a download instruction from the user.

In some implementations, after downloading the application bundle 128, the computing device may automatically initiate installation of the application bundle 128. In other implementations, after downloading the application bundle 128, the computing device may notify the user that the application bundle 128 has been downloaded and initiate installation of the application bundle 128 in response to an install instruction from the user.

Thus, a computing device may send the request 126 to acquire the application 120. Based on the dependencies 114, the server 104 may determine whether the application 120 has any prerequisite applications or prerequisite features. If the application 120 has one or more prerequisite applications, the server 104 may include the prerequisite applications 122 in the application bundle 128. If the application 120 has one or more prerequisite features, the server 104 may include the prerequisite features 124 in the application bundle 128. The 104 server may include a digital signature 130 in the application bundle 128 that identifies an author of the application bundle 128. The server may 104 encode the application bundle 128 (and its contents) using the DRM encoding 132. After creating the application bundle 128, the server 104 may inform the computing device 102 that the application bundle 128 is available for download by sending the notification 134 to the computing device 134. The memory 110 may include instructions 136 that are executable by the one or more processors 108 to perform the various functions of the server 104 as described herein.

Figure 2:
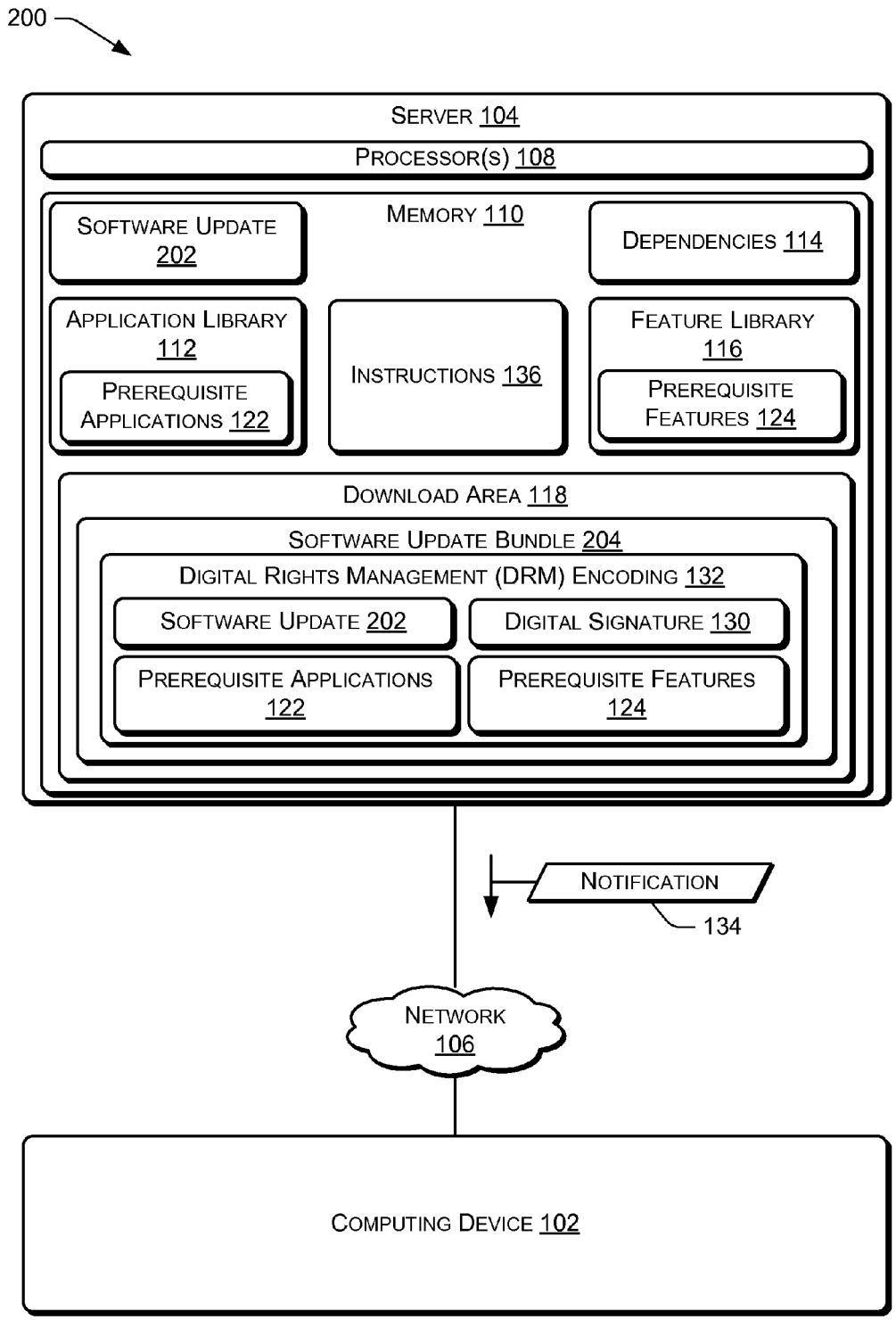
FIG. 2 illustrates an example framework to distribute software.

FIG. 2 illustrates an example framework 200 to distribute software. The framework 200 includes the computing device 102 coupled to the server 104 via the network 106.

The memory 110 may include software updates, such as a software update 202, that may be downloaded and installed in a computing device, such as the computing device 102. Based on how the software update 202 is implemented, the software update 202 may be a standalone update or the software update 202 may have one or more prerequisite applications 122, one or more prerequisite features 124, one or more prerequisite software updates, or any combination thereof. For example, the software update 202 may use at least a portion of the functionality provided by the one or more prerequisite applications 122 and may therefore have a dependency to the prerequisite applications 122. The application 120 may use at least a portion of the functionality provided by the one or more prerequisite features 124 and may therefore have a dependency to the prerequisite features 124.

The dependencies 114 may include information identifying the applications in the application library 112 that are compatible with a particular generation of the computing device 102, a particular version of the computing device 102, a current system software of the computing device 102, a current set of applications that are installed in the computing device 102, a current set of features that are installed in the computing device 102, other hardware or software characteristics of the computing device 102, or any combination thereof.

In operation, the server 104 may identify characteristics of the computing device 102, such as a generation of the computing device 102, a version of the computing device 102, a hardware configuration of the computing device 102, a software configuration of the computing device 102, or any combination thereof. For example, the hardware configuration may identify particular hardware components that are available in the computing device 102. The software configuration may include information about system software components, applications, features, or any combination thereof that are installed in the computing device 102. The server 104 may identify the characteristics of the computing device 102 in response to receiving a request (e.g., the request 126 of FIG. 1) for the server 104 to determine whether the software update 202 is available or to make the software update 202 available for download. In some implementations, the server 104 may determine that the software update 202 is available in response to receiving the request 126 to download the application 120.

The server 104 may create a software update bundle 204 based on the characteristics of the computing device 102. The software update bundle 204 may include the software update 202. Based on the dependencies 114 that are associated with the software update 202, the software update bundle 204 may include the prerequisite applications 122, the prerequisite features 124, or both.

In some implementations, the software update bundle 204 may include a digital signature 130. In some implementations, the digital signature 130 may include multiple digital signatures, such as a digital signature for each application or feature in the software update bundle 204. For example, the digital signature 130 may include a digital signature for the software update 202, a digital signature for each of the prerequisite applications 122, a digital signature for each of the prerequisite features 124, or any combination thereof. The digital signature may identify an author, a provider, a manufacturer, or other characteristic of a feature or an application. For example, a digital signature associated with each application or feature in the software update bundle 204 may identify their respective authors while the digital signature 130 may identify a provider (e.g., a merchant) of the software update 202.

In some implementations, the contents of the software update bundle 204 may be encoded using a DRM encoding 132 to prevent unauthorized usage. For example, the DRM encoding 132 may enable a user who acquires the software update bundle 204 to install the software update bundle 204 in the computing device 102 and prevent the software update bundle 204 from being installed in other computing devices.

After creating the software update bundle 204, the server 104 may place the software update bundle 204 in the download area 118. In FIG. 2, the download area 118 is depicted as part of the memory 110 of the server 104. However, in some implementations, the download area 118 may be in a memory of another server, such as a download server. The server 104 may send a notification 134 to the computing device 102 via the network 106 to notify the computing device 102 that the software update bundle 204 is available.

In some implementations, in response to receiving the notification 134, the computing device 102 may automatically (e.g., without human interaction) initiate download of the software update bundle 204 from the download area 118. In other implementations, in response to receiving the notification 134, the computing device 102 may notify a user that the software update bundle 204 is available for download, and initiate download of the software update bundle 204 in response to a download instruction from the user.

In some implementations, after downloading the software update bundle 204, the computing device may automatically initiate installation of the software update bundle 204. In other implementations, after downloading the software update bundle 204, the computing device may notify the user that the software update bundle 204 has been downloaded and initiate installation of the software update bundle 204 in response to an install instruction from the user.

Thus, based on the dependencies 114, the server 104 may determine any prerequisite applications or prerequisite features for the software update 202. If the software update 202 has one or more prerequisite applications, the server 104 may include the prerequisite applications 122 in the software update bundle 204. If the software update 202 has one or more prerequisite features, the server 104 may include the prerequisite features 124 in the software update bundle 204. The 104 server may include a digital signature 130 in the software update bundle 204 that identifies an author of the application bundle 128. The server may 104 encode the software update bundle 204 (and its contents) using the DRM encoding 132. After creating the software update bundle 204, the server 104 may inform the computing device 102 that the software update bundle 204 is available for download by sending the notification 134 to the computing device 134.

Figure 3:
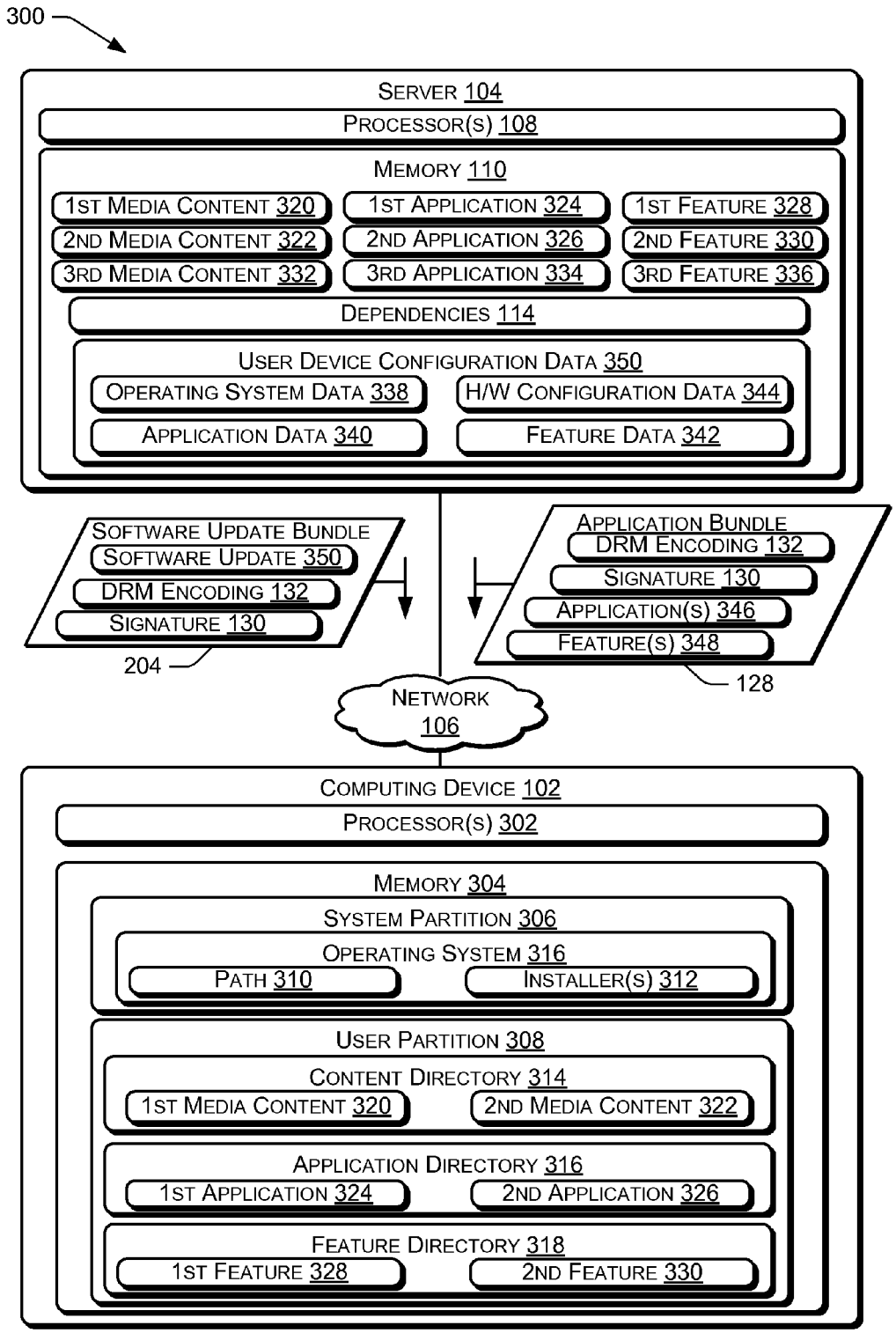
FIG. 3 illustrates an example framework to distribute software.

FIG. 3 illustrates an example framework 300 to distribute software. The framework 300 includes the computing device 102 coupled to the server 104 via the network 106.

The computing device 102 may include one or more processors 302 and a memory 304. The memory 304 may include multiple partitions, such as a system partition 306 and a user partition 308. The system partition 306 may include system software, such as an operating system 316. The operating system 316 may include a path 310 that identifies locations (e.g., directories) of applications and features in the memory 304 of the computing device 102. The operating system 316 may include one or more installers 312, such as a system software update (e.g., operating system) installer, a feature installer, an application installer, an application bundle installer, a software update installer, or any combination thereof.

The system partition 306 may be a protected portion of the memory that can be altered (e.g., written to) only under specific conditions and/or by specific installers. For example, a system software update installer may be granted permission to write to the system partition 306 during a system software update. As another example, a feature installer or an application installer may be granted permission to modify the path 310 during installation of a feature or an application, respectively. In some implementations, a particular installer may use other installers from the installers 312. For example, an application bundle installer may call on a feature installer to install the features included in an application bundle. As another example, a software update installer may call on a feature installer to install features included in a software update bundle or call on an application installer to install applications included in the software update bundle.

The user partition 308 may include one or more directories, such as a content directory 314, an application directory 316, and a feature directory 318. The content directory 314 may include one or more media content items, such as a first media content 320 item and a second media content 322 item. For example, the media content 320 and 322 items may include an eBook, audio content, video content, multimedia content, and the like. The application directory 316 may be a location in which one or more applications, such as a first application 324 and a second application 326, may be installed. The feature directory 318 may be a location in which one or more features, such as a first feature 328 and a second feature 330, may be installed.

The memory 110 of the server 104 may include media content, such as the media content 320, the media content 322, and a media content 332, that is available for acquisition. The memory 110 of the server 104 may include one or more applications, such as the first application 324, the second application 326, and a third application 334, that are available for acquisition. The memory 110 of the server 104 may include one features, such as the first feature 328, the second feature 330, and a third feature 336, that are available for acquisition.

The memory 110 may include the dependencies 114 and user device configuration data 350. The user device configuration data 350 may include information associated with one or more computing devices, such as the computing device 102. For example, the user device configuration data 350 may include operating system data 338, application data 340, feature data 344, hardware (H/W) configuration data 342 or combinations thereof. The operating system data 338 may include information associated with the operating system 316, such as which version of the operating system 316 is currently installed in the computing device 102. The application data 340 may include information identifying the applications (e.g., the applications 324 and 326) that are installed in the computing device 102. The feature data 342 may include information identifying the features (e.g., the features 328 and 330) that are installed in the computing device 102. The hardware configuration data 344 may include information about hardware included in the computing device 102, such as a hardware generation, a hardware version (e.g., color or monochrome display, GPS capabilities, and the like), other types of hardware that is installed (e.g., one or more cameras), or combinations thereof.

In operation, a user associated with the computing device 102 may initiate acquisition of an application, such as the third application 334. In response, the server 104 may create the application bundle 128. The application bundle 128 may include one or more applications 346, such as the third application 334. If the third application 334 has prerequisite applications, such as the prerequisite applications 122 of FIG. 1, the application bundle 128 may include the prerequisite applications in the applications 346. If the third application 334 has prerequisite features, such as the prerequisite features 124 of FIG. 1, the application bundle 128 may include one or more features 348. In some cases, the application bundle 128 may include the signature 130 to identify an author or creator of the application bundle 128. In some instances, the contents (e.g., the applications 346, the features 348, the signature 130 or combinations thereof) of the application bundle 128 may be encoded using the DRM encoding 132. After creating the application bundle 128, the server 104 may notify the computing device 102 that the application bundle 128 is available for download.

The computing device 102 may initiate download of the application bundle 128 from the server 104. After the download is complete, the DRM encoding 132 may be decoded, the signature 130 may be authenticated, or both actions may be performed. One or more of the installers 312 may be used to install the contents of the application bundle 128. For example, an application installer from the installers 312 may install the applications 436 in the application directory 316 and update the path 310 to include the installation location(s) of the applications 436. The installation locations of the applications 436 may be subdirectories of the application directory 316. For example, the first application 324 may be installed in a first subdirectory of the application directory 316 and the second application 326 may be installed in a second subdirectory of the application directory 316. A feature installer from the installers 312 may install the features 348 in the feature directory 318 and update the path 310 to include the installation location(s) of the features 438. The installation locations of the features 438 may be subdirectories of the feature directory 318. For example, the first feature 328 may be installed in a first subdirectory of the feature directory 318 and the second feature 330 may be installed in a second subdirectory of the feature directory 318.

The server 104 may determine that a software update 350 is available for the computing device 102. For example, when the computing device 102 initiates acquisition of an application, the server 104 may identify the computing device 102, locate the corresponding user device configuration data 350, and determine whether the software update 350 is compatible with the computing device 102 based on the user device configuration data 350. In response to determining that the software update 350 is compatible with the computing device 102, the server 104 may create the software update bundle 204 that includes the software update 350. In some cases, the signature 130 may be included in the software update bundle 204 to identify a creator of the software update 350. In some instances, the DRM encoding 132 may be included in the software update bundle 204 to prevent unauthorized usage. The software update 350 may include one or more applications, one or more features, other software that is compatible with the computing device 102, or combinations thereof. After creating the software update bundle 204, the server 104 may notify the computing device 102 that the software update bundle 204 is available for download.

The computing device 102 may initiate download of the software update bundle 204 from the server 104. After the download is complete, the DRM encoding 132 may be decoded and/or the signature 130 may be authenticated. One or more of the installers 312 may be used to install the software update 350. For example, a software update installer from the installers 312 may install the software update 350. If the software update 350 includes one or more features, the software update installer may call a feature installer to install the one or more features in the feature directory 318. If the software update 350 includes one or more applications, the software update installer may call an application installer to install the one or more applications in the feature directory 318. If the software update 350 includes an operating system update, the software update installer may call an operating system update installer to install the operating system update in the system partition 306.

Example Dependencies

FIG. 4 illustrates an example 400 of dependencies, such as the dependencies 114 of FIGS. 1-3. The dependencies 114 may identify a particular application or software update 402 and any associated prerequisites, such as the prerequisite applications 122, the prerequisite features 124, prerequisite system software 404, prerequisite hardware 406, other characteristics of the computing device 102, or any combination thereof. Of course, other prerequisites may be included in the dependencies 114 in addition to or instead of the prerequisites 122, 124, 404, or 406. In some implementations, one or more of the prerequisite applications 122 may include different versions of a particular application. For example, a first version of the particular application may be compatible with a first system software, a second version of the particular application may be compatible with a second system software, and so on. Similarly, one or more of the prerequisite features 124 may include different versions of a particular feature. For example, a first version of the particular feature may be compatible with a first system software, a second version of the particular feature may be compatible with a second system software, and so on.

The prerequisite applications 122 may identify applications from the applications library 112 that are used by the particular application or software update 402. The prerequisite features 124 may identify features from the feature library 116 that are used by the particular application or software update 402. The prerequisite system software 404 may identify system software that is used by the particular application or software update 402. The prerequisite hardware 406 may identify hardware characteristics of the computing device 102 that are compatible with the particular application or software update 402. For example, the prerequisite hardware 406 may identify particular generations of the computing device 402 that are compatible with the particular application or software update 402. The prerequisite hardware 406 may identify particular versions of the computing device 402 that are compatible with the particular application or software update 402. For example, different versions of the computing device 402 may have different hardware characteristics, such as an amount of memory, a type of display (e.g., color or monochrome), particular capabilities (e.g., GPS capable), and the like.

In FIG. 4, the first application 408 has none of the prerequisite applications 122, none of the prerequisite features 124, uses a first system software, and may be compatible with a first generation of the computing device 102 that has a monochrome display. The second application 410 may use the first application 408, none of the prerequisite applications 124, use the first system software, and may be compatible with a second generation of the computing device that has a color display. The third application 412 may use none of the prerequisite applications 122, use a first feature, use the first system software, and may be compatible with all hardware generations and versions.

The fourth application 414 may use the second application 410, use the first feature and a second feature, use a second system software, and may be compatible with a second generation of the computing device 102 with at least 32 gigabytes (GB) of memory. The fifth application 416 may use the first application 408 and the second application 410, none of the prerequisite features 124, use a third system software, and may be compatible with all versions and all generations of the computing device 102. The sixth application 418 may use none of the prerequisite applications 122, none of the prerequisite features 124, use the first system software, and may be compatible with all generations of the computing device 102 that are GPS capable (e.g., include hardware that can use GPS satellites to determine a location of the computing device 102).

The first software update 420 may use none of the prerequisite applications 122, use a third feature, use the first system software, and may be compatible with all versions and all generations of the computing device 102. The second software update 422 may use none of the prerequisite applications 122, use the first software update 420, use the first system software, and may be compatible with all generations of the computing device 102 that have a color display.

The dependencies 114 may be used by the server 104 to identify applications from the application library 112 and to identify features from the feature library 114 to include in the application bundle 128 or the software update bundle 204. In this way, the application bundle 128 or the software update bundle 204 may include applications and features that are compatible with a particular computing device.

Example Processes

Figure 5:
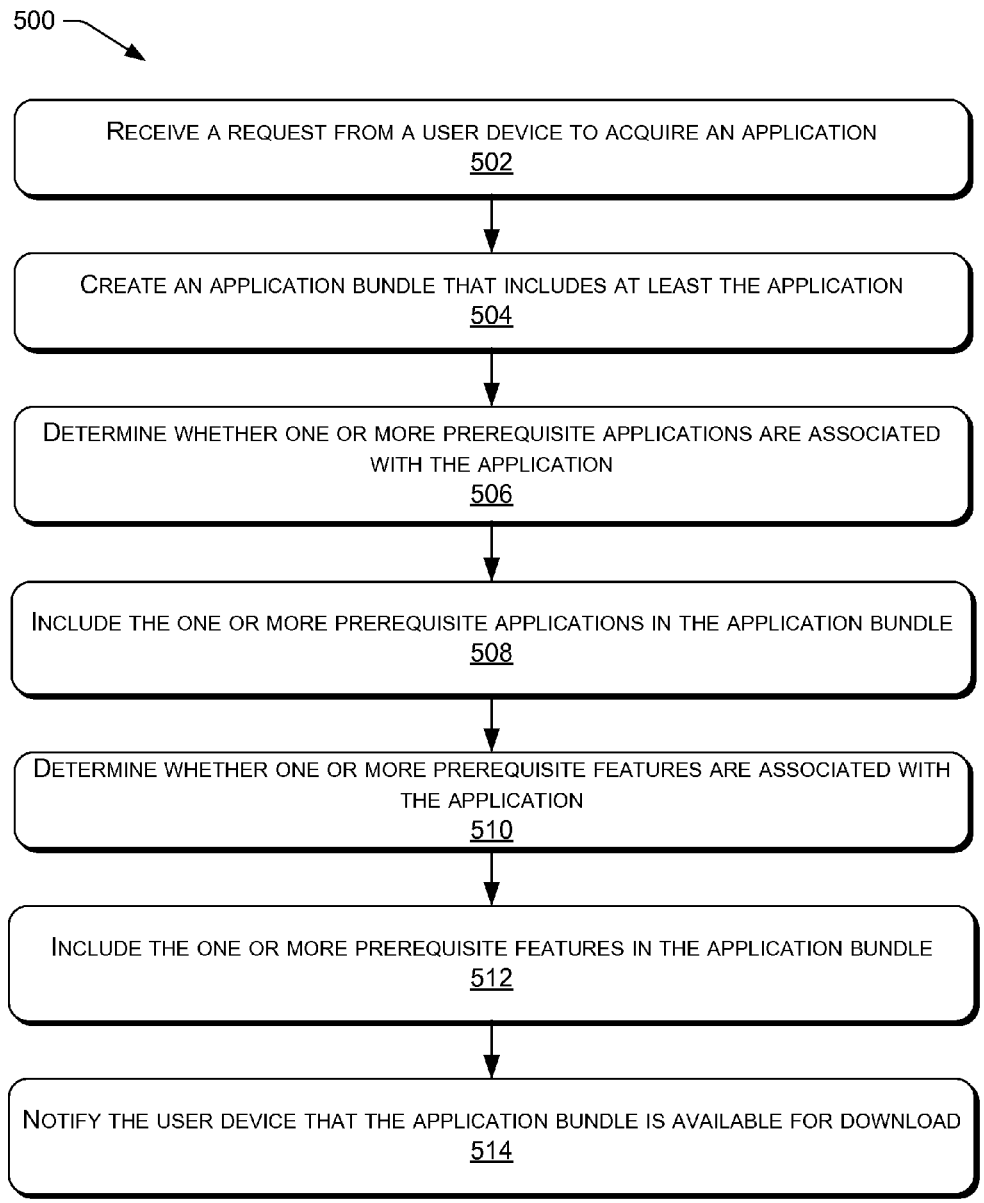
FIG. 5 is a flow diagram of a process from the standpoint of a server to create an application bundle.
Figure 6:
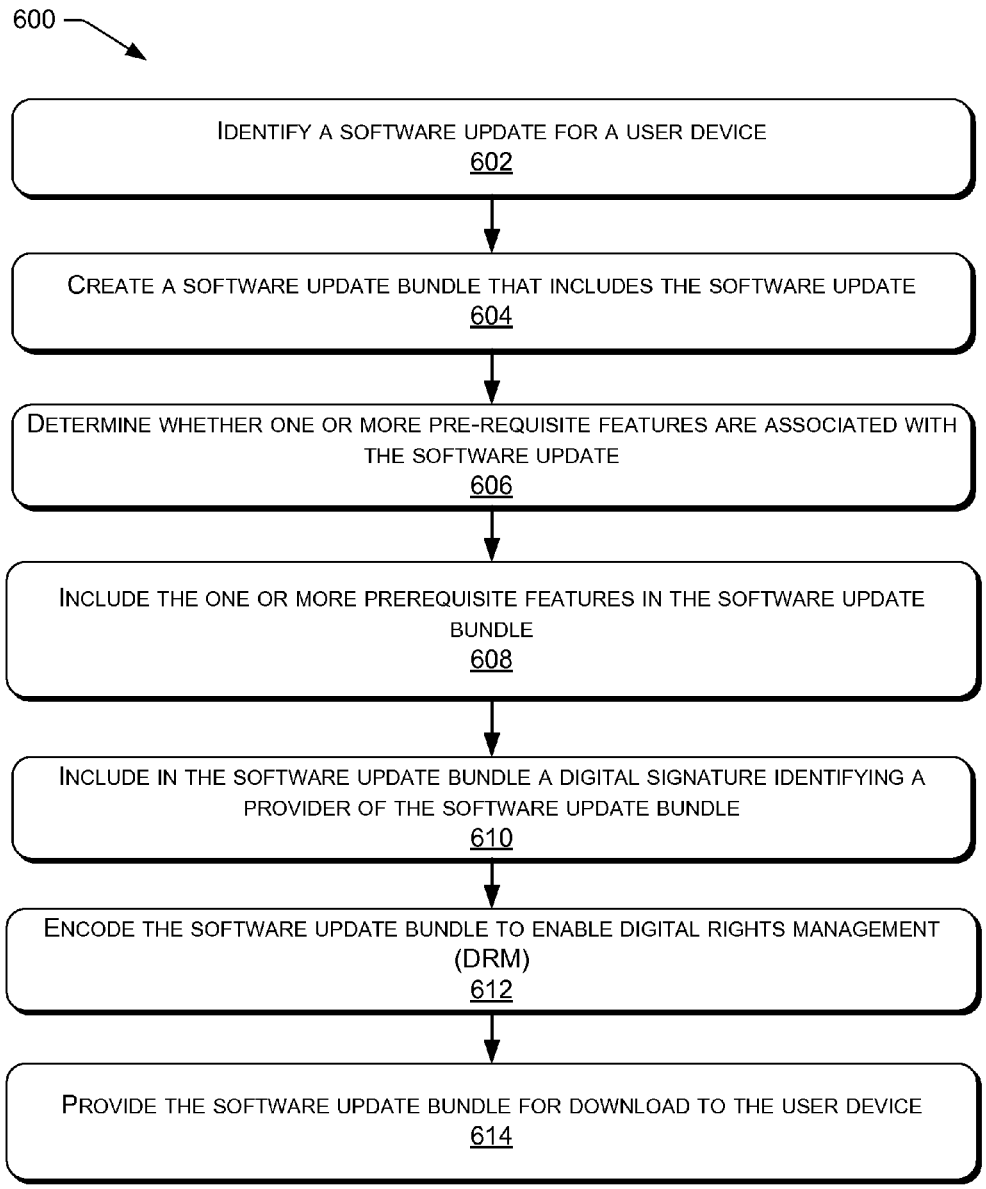
FIG. 6 is a flow diagram of a process from the standpoint of a server to create a software update bundle.
Figure 7:
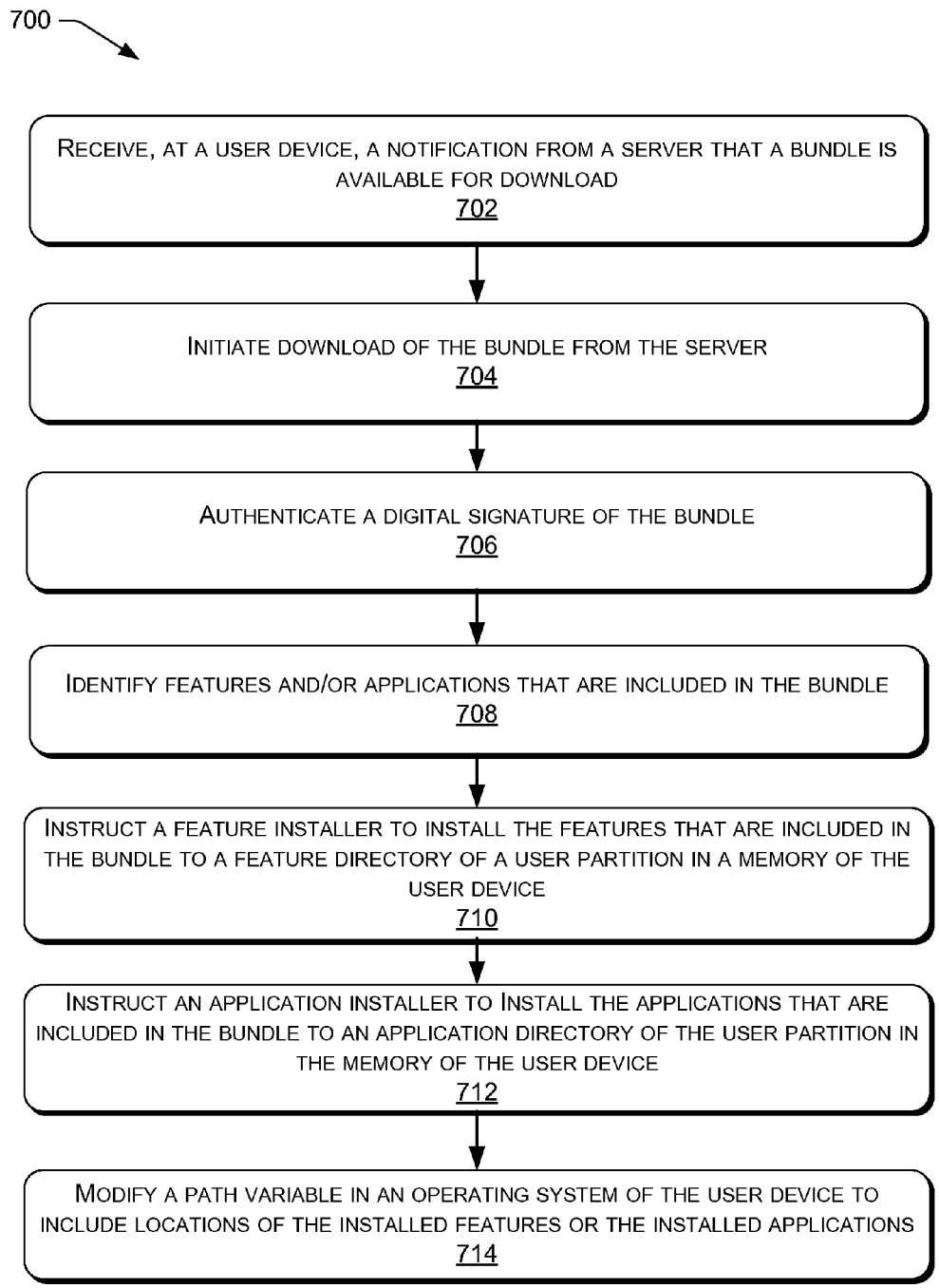
FIG. 7 is a flow diagram of a process from the standpoint of a computing device to download a bundle from a server.

FIGS. 5-7 show processes that may be performed to distribute software (e.g., application bundles, software update bundles, features, applications, or combinations thereof) to one or more computing devices. The processes 500, 600, and 700 are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The operations described in FIGS. 5-7 may be performed by one or more of the components shown in FIGS. 1-3, such as the devices 102 and 104, other computing devices, or a combination thereof.

FIG. 5 is a flow diagram of a process 500 from the standpoint of a server to create an application bundle. For example, the process 500 may be performed by a server, such as the server 104 of FIGS. 1-3.

At 502, a request is received from a user device (e.g., the computing device 102 of FIG. 1) to acquire an application. At 504, an application bundle is created that includes the application. For example, in FIG. 1, the server 104 may create the application bundle 128 that includes the application 112 in response to receiving the request 126 from the computing device 102. In addition to the application, the application bundle may include any prerequisite software components (e.g., prerequisite features, prerequisite application, or both) associated with the application.

At 506 a determination is made whether one or more prerequisite applications are associated with the application. At 508, the one or more prerequisite applications are included in the application bundle if the application has the one or more prerequisite applications. For example, in FIG. 1, the server 104 may select the perquisite applications 122 from the applications library 112 for inclusion in the application bundle 128 based on the dependencies 114. In some cases, particular versions (e.g., version one, version two, and the like) of the prerequisite applications may be identified and included in the application bundle 128. If no prerequisite applications are associated with the application, then no prerequisite applications are included in the application bundle.

At 510, a determination is made whether one or more prerequisite features are associated with the application. At 512, the one or more prerequisite features are included in the application bundle if the application has the one or more prerequisite features. For example, in FIG. 1, the server 104 may select the perquisite features 124 from the feature library 116 for inclusion in the application bundle 128 based on the dependencies 114. In some cases, particular versions of the prerequisite features may identified and included in the application bundle 128. If no prerequisite features are associated with the application, then no prerequisite features are included in the application bundle.

At 514, the user device may be notified that the application bundle is available for download. For example, in FIG. 1, the server 104 may send the notification 134 to the computing device 102 to notify the computing device 102 that the application bundle 128 is available for download.

FIG. 6 is a flow diagram of a process 600 from the standpoint of a server to create an application bundle. The process 600 may be performed by a server, such as the server 104 of FIGS. 1-3.

At 602, a software update for a user device (e.g., the computing device 102 of FIG. 1) is identified. At 604, a software bundle is created that includes the software update. For example, in FIG. 3, the server 104 may determine that the software update 350 is available for the computing device 102 based on the user device configuration data 380. The server 104 may create the software update bundle 204 if the software update 350 is available.

At 606 a determination is made whether one or more prerequisite features are associated with the software update. At 608, the one or more prerequisite features are included in the software bundle if the software update has the one or more prerequisite features. If there are no prerequisite features, then no features are included in the software update. For example, in FIG. 2, the server 104 may select the prerequisite features 124 from the feature library 116 for inclusion in the software bundle 128 based on the dependencies 114. In some cases, particular versions of the prerequisite features may be included in the software update bundle 204. For example, a particular prerequisite feature may have three different versions. One of the versions of the particular prerequisite feature may be chosen based on the hardware capabilities and the installed software (e.g., system software, installed applications, installed features, other hardware/software characteristics, or any combination thereof).

At 610, a digital signature that identifies a provider of the software update may be included in the software update bundle. For example, the digital signature 130 may be included in the application bundle 128 of FIG. 1 or the software update bundle 204 of FIG. 2.

At 612, the software update bundle may be encoded to enable DRM and thereby prevent unauthorized usage.

At 614, the software update bundle may be provided for download to the user device 614. For example, in FIG. 2, the server may send the notification 134 to the computing device 102. In some implementations, the notification may cause the computing device 102 to automatically download and install the software update bundle 204. In other implementations, the computing device 102 may notify a user that the software update bundle 204 is available for download or installation.

FIG. 7 is a flow diagram of a process 700 from the standpoint of a user device to download a bundle. The process 700 may be performed by a computing device, such as the computing device 102 of FIGS. 1-3.

At 702, a notification is received from a server that a bundle is available for download. The bundle may include software written in a scripting language. For example, the bundle may be the application bundle 128 of FIG. 1 or the software update bundle 204 of FIG. 2.

At 704 download of the bundle is initiated. For example, the computing device 102 may initiate download of the application bundle 128 of FIG. 1 or the software update bundle 204 of FIG. 2.

At 706, a digital signature of the bundle may be authenticated. For example, in FIG. 3, one of the installers 312 may authenticate the signature 130.

At 708, features and/or applications that are included in the bundle may be identified. For example, in FIG. 3, one of the installers 312 may identify the applications 348 or the features 350 included in the application bundle 128. The one of the installers 312 may identify the software update 346 and determine whether the software update 346 includes one or more features, one or more applications, or a combination of features and applications.

At 710, a feature installer may be instructed to install the features that are included in the bundle to a feature directory of a user partition in a memory of the user device. At 712, an application installer may be instructed to install the applications that are included in the bundle to an application directory of the user partition in the memory of the user device. For example, in FIG. 3, the installers 312 may include a software update installer, an application installer, and a feature installer. The software update installer may instruct the application installer to install applications included in the software update 346 and instruct the feature installer to install features included in the software update 346.

At 714 a path variable may be modified to include locations of the installed features or locations of the installed applications. For example, in FIG. 3, the path 310 may be modified to include subdirectories of the application directory 316 where the applications 346 were installed or subdirectories of the feature directory 318 where the features 348 were installed.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. A computing device comprising:
one or more processors; and
a memory comprising a user partition and a system partition, the system partition comprising a protected portion of the memory storing system software including an operating system of the computing device, the user partition comprising a portion of the memory used to store content and applications, the memory including instructions that are executable by the one or more processors to perform acts comprising:
receiving, from a server, a notification that a software bundle is available for download, wherein the software bundle includes an update to the system software;
downloading the software bundle from the server;
authenticating a digital signature of the software bundle;
installing the software bundle in the user partition of the memory; and
modifying a path variable in the operating system of the computing device to include a location in which the software bundle is installed, wherein the computing device is capable of executing the installed software bundle without restarting the operating system based on the modified path variable.

2. The computing device of claim 1, wherein the software bundle comprises one or more applications.

3. The computing device of claim 2, wherein the one or more applications include an application and prerequisite applications associated with the application.

4. The computing device of claim 3, wherein the software bundle further comprises prerequisite features associated with the application.

5. The computing device of claim 2, wherein installing the software bundle in the user partition comprises instructing an application installer to install the one or more applications in an application directory of the user partition.

6. The computing device of claim 5, wherein modifying the path variable comprises modifying the path variable to include the application directory.

7. The computing device of claim 1, wherein installing the software bundle in the user partition comprises instructing a feature installer to install one or more features included in the bundle to a feature directory of the user partition.

8. The computing device of claim 7, wherein modifying the path variable comprises modifying the path variable to include the feature directory.

9. The computing device of claim 1, wherein the software bundle includes at least one feature to address a bug in the operating system.

10. The computing device of claim 9, wherein the at least one feature is implemented via a scripting language.

11. The computing device of claim 1, wherein the acts further comprise:
receiving, from the server, a notification that an updated operating system is available for download;
downloading the updated operating system update from the server authenticating the updated operating system; and
installing the updated operating system in the system partition of the memory.

12. The computing device of claim 11, wherein the acts further comprise:
deleting the software bundle that was installed in the user partition; and
modifying the path variable to remove the location in which the software bundle was installed.

13. A computer-implemented method comprising:
receiving, at a computing device, a notification from a server that a software bundle is available for download, the software bundle including an update to system software that includes an operating system, the system software installed on a system partition comprising a protected portion of a memory of the computing device;
downloading the software bundle from the server;
authenticating a digital signature of the software bundle;
installing the software bundle in a user partition of the memory, the user partition comprising a portion of the memory used to store content and applications; and
modifying a path variable in the operating system of the computing device to include a location in which the software bundle is installed, wherein the computing device is capable of executing the installed software bundle without restarting the operating system based on the modified path variable.

14. The computer-implemented method of claim 13, wherein the software bundle comprises a particular application.

15. The computer-implemented method of claim 14, wherein the software bundle includes one or more prerequisite applications associated with the particular application.

16. The computer-implemented method of claim 14, wherein the software bundle includes one or more prerequisite features associated with the particular application.

17. The computer-implemented method of claim 14, wherein installing the software bundle in the user partition comprises instructing an application installer to install the particular application in an application directory of the user partition.

18. The computer-implemented method of claim 17, wherein modifying the path variable comprises modifying the path variable to include the application directory.

19. The computer-implemented method of claim 14, wherein:
installing the software bundle in the user partition comprises instructing an application installer to install the particular application in an application directory of the user partition; and
modifying the path variable comprises modifying the path variable to include the application directory.

20. A non-transitory memory device storing instructions executable by one or more processors to perform operations comprising:
- receiving, at a computing device, a notification from a server that a software bundle is available for download, the software bundle including an update to system software that includes an operating system, the system software installed on a system partition comprising a protected portion of the memory;
- downloading the software bundle from the server;
- authenticating a digital signature of the software bundle;
- installing the software bundle in a user partition of the memory, the user partition comprising a portion of the memory used to store content and applications; and
- modifying a path variable in the operating system of the computing device to include a location in which the software bundle is installed, wherein the computing device is capable of executing the installed software bundle without restarting the operating system based on the modified path variable.

21. The non-transitory memory device of claim 20, wherein the software bundle comprises a particular application.

22. The non-transitory memory device of claim 21, wherein the software bundle includes one or more prerequisite applications associated with the particular application.

23. The non-transitory memory device of claim 21, wherein the software bundle includes one or more prerequisite features associated with the particular application.

24. The non-transitory memory device of claim 21, wherein installing the software bundle in the user partition comprises instructing an application installer to install the particular application in an application directory of the user partition.

25. The non-transitory memory device of claim 24, wherein modifying the path variable comprises modifying the path variable to include the application directory.

* * * * *